US009525986B2

United States Patent
Melin

(10) Patent No.: US 9,525,986 B2
(45) Date of Patent: Dec. 20, 2016

(54) METHOD AND APPARATUS FOR PROVIDING TRIGGERED-PRESENTATION OF A PARTICIPANT MESSAGE ASSOCIATED WITH A MULTI-PARTY COMMUNICATION SESSION

(75) Inventor: Paul Henry Kristian Melin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 963 days.

(21) Appl. No.: 13/604,079

(22) Filed: Sep. 5, 2012

(65) Prior Publication Data

US 2014/0066035 A1    Mar. 6, 2014

(51) Int. Cl.
| | | |
|---|---|---|
| H04W 4/16 | (2009.01) | |
| H04M 3/56 | (2006.01) | |
| H04L 29/06 | (2006.01) | |
| H04W 4/12 | (2009.01) | |

(52) U.S. Cl.
CPC ............ *H04W 4/16* (2013.01); *H04L 65/1069* (2013.01); *H04L 65/1093* (2013.01); *H04L 65/403* (2013.01); *H04M 3/56* (2013.01); *H04W 4/12* (2013.01)

(58) Field of Classification Search
CPC ........... H04W 4/16; H04L 12/58; H04L 67/18; H04L 65/403; H04L 12/581; H04L 51/24; H04L 12/587; H04L 65/1016; H04L 67/24; H04L 67/306; H04L 12/2818; H04L 12/5845; H04L 51/10; H04L 65/1093; H04M 2203/652
USPC . 455/416, 413, 414.1–414.4, 466; 709/7.13; 379/202.01
See application file for complete search history.

(56) References Cited

U.S. PATENT DOCUMENTS

| | | | |
|---|---|---|---|
| 6,608,636 B1 | 8/2003 | Roseman | |
| 7,904,323 B2 | 3/2011 | Wynn et al. | |
| 2006/0056614 A1* | 3/2006 | Chiu ..................... | H04M 3/533 379/202.01 |
| 2009/0234721 A1 | 9/2009 | Bigelow et al. | |
| 2010/0251119 A1* | 9/2010 | Geppert .............. | G06F 3/04817 715/716 |
| 2011/0092230 A1* | 4/2011 | Wenger ................... | H04L 12/58 455/466 |
| 2011/0271332 A1* | 11/2011 | Jones .................... | H04L 9/3247 726/7 |

(Continued)

OTHER PUBLICATIONS

Barnes et al., "A Framework for Centralized Conferencing RFC 5239", webpage, Jun. 2008, pp. 1-46, http://datatracker.ietf.org/doc/rfc5239/?include_text=1.

(Continued)

*Primary Examiner* — Khawar Iqbal
(74) *Attorney, Agent, or Firm* — Alston & Bird LLP

(57) ABSTRACT

An approach is provided for providing triggered-presentation of a participant message associated with a multi-party communication session. The message presentation platform determines an input for specifying at least one message from at least one participant of a multi-party communication session after an initiation of the multi-party communication session. Then, the message presentation platform causes, at least in part, a presentation of the at least one message to at least one other participant of the multi-party communication session based, at least in part, on determining that the at least one other participant has joined or tried to join the multi-party communication session.

16 Claims, 10 Drawing Sheets

(56) References Cited

U.S. PATENT DOCUMENTS

| | | | | |
|---|---|---|---|---|
| 2011/0305331 | A1* | 12/2011 | Hughes | H04M 7/003 379/202.01 |
| 2012/0063573 | A1 | 3/2012 | Sylvain | |
| 2012/0143972 | A1* | 6/2012 | Malik | H04L 51/36 709/206 |
| 2012/0179502 | A1* | 7/2012 | Farooq | G06Q 10/06311 705/7.13 |
| 2012/0262537 | A1* | 10/2012 | Baker | H04N 7/152 348/14.08 |
| 2012/0331405 | A1* | 12/2012 | Eidelson | H04M 1/72552 715/758 |
| 2013/0035114 | A1* | 2/2013 | Holden | H04W 4/028 455/456.3 |
| 2013/0144603 | A1* | 6/2013 | Lord | H04L 12/1831 704/9 |
| 2013/0305167 | A1* | 11/2013 | Bastide | H04L 65/1069 715/753 |
| 2014/0018046 | A1* | 1/2014 | Grenier | H04W 4/12 455/413 |
| 2014/0106799 | A1* | 4/2014 | Audenaert | G06Q 10/107 455/466 |
| 2015/0172362 | A1* | 6/2015 | Hardebeck | H04L 67/36 715/740 |
| 2016/0088259 | A1* | 3/2016 | Anderson | H04L 12/1827 348/14.03 |

OTHER PUBLICATIONS

Mayer, "Conferencing using the IP Multimedia (IM) Core Network (CN) subsystem; stage 3", webpage, pp. 1-2, http://www.3gpp.org/ftp/Specs/html-info/24147.htm.

Portman et al. "Session Recording Protocol draft-ietf-siprec-protocol-09", webpage, Dec. 7, 2012, pp. 1-36, http://datatracker.ietf.org/doc/draft-ietf-siprec-protocol/?include_text=1.

Teligent, "Conference Call", webpage, pp. 1-2 http://www.teligent.com/services/conferencecall.html.

* cited by examiner

METHOD AND APPARATUS FOR PROVIDING TRIGGERED-PRESENTATION OF A PARTICIPANT MESSAGE ASSOCIATED WITH A MULTI-PARTY COMMUNICATION SESSION

BACKGROUND

Service providers, collaboration software providers, and device manufacturers (e.g., wireless, cellular, etc.) are continually challenged to deliver value and convenience to consumers by, for example, providing compelling network services. For example, such network services include conferencing services that enable multi-party communication sessions between users. However, typical conferencing services lack a seamless asynchronous communication approach that often result in conferences being canceled, rescheduled, or substantially delayed, for instance, when scheduled participants are late or forget to inform other participants of their inability to attend. Consequently, user experience associated with such conferencing services is negatively affected.

SOME EXAMPLE EMBODIMENTS

Therefore, there is a need for an effective and efficient approach for enhancing optimal user experience through triggered-presentation of a participant message associated with a multi-party communication session, for instance, to resolve issues relating to lack of a seamless asynchronous communication during a multi-party communication session.

According to one embodiment, a method comprises determining an input for specifying at least one message from at least one participant of a multi-party communication session after an initiation of the multi-party communication session (e.g., initiation of the multi-party collaboration session including the event of the first participant becoming available for connection to a session, even if other participants have not yet connected to the session). The method also comprises causing, at least in part, a presentation of the at least one message to at least one other participant of the multi-party communication session based, at least in part, on determining that the at least one other participant has joined or tried to join the multi-party communication session.

According to another embodiment, an apparatus comprises at least one processor, and at least one memory including computer program code for one or more computer programs, the at least one memory and the computer program code configured to, with the at least one processor, cause, at least in part, the apparatus to determine an input for specifying at least one message from at least one participant of a multi-party communication session after an initiation of the multi-party communication session. The apparatus is also caused to cause, at least in part, a presentation of the at least one message to at least one other participant of the multi-party communication session based, at least in part, on determining that the at least one other participant has joined or tried to join the multi-party communication session.

According to another embodiment, a computer-readable storage medium carries one or more sequences of one or more instructions which, when executed by one or more processors, cause, at least in part, an apparatus to determine an input for specifying at least one message from at least one participant of a multi-party communication session after an initiation of the multi-party communication session. The apparatus is also caused to cause, at least in part, a presentation of the at least one message to at least one other participant of the multi-party communication session based, at least in part, on determining that the at least one other participant has joined or tried to join the multi-party communication session.

According to another embodiment, an apparatus comprises means for determining an input for specifying at least one message from at least one participant of a multi-party communication session after an initiation of the multi-party communication session. The apparatus also comprises means for causing, at least in part, a presentation of the at least one message to at least one other participant of the multi-party communication session based, at least in part, on determining that the at least one other participant has joined or tried to join the multi-party communication session.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method disclosed herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing triggered-presentation of a participant message associated with a multi-party communication session are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
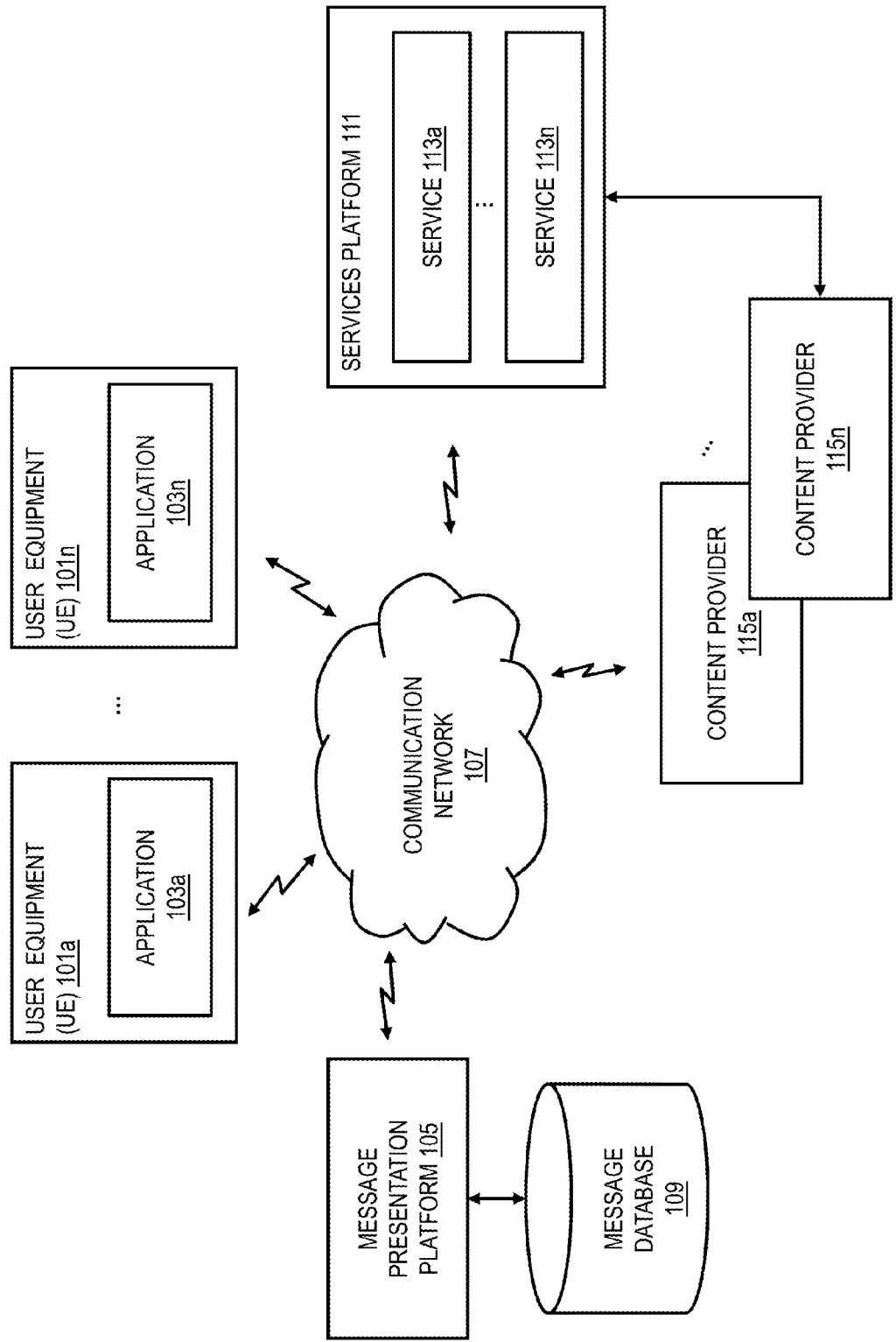
FIG. 1 is a diagram of a system capable of providing triggered-presentation of a participant message associated with a multi-party communication session, according to one embodiment.

FIG. 1 is a diagram of a system capable of providing triggered-presentation of a participant message associated with a multi-party communication session, according to one embodiment. As mentioned, typical conferencing services lack a seamless asynchronous communication approach that often result in conferences being canceled, rescheduled, or substantially delayed, leading to poor user experience associated with such conferencing services. For example, some participants may be late to a scheduled multi-party conference, while absence participants may have forgotten to inform other participants of their possible absence in advance. As such, participants who attend the multi-party conference at the agreed time may be unsure of whether to wait for missing participants or to cancel the conference. Further, on-time participants may cancel or leave the conference before missing participants arrive (e.g., as a result of their uncertainty regarding the current status of the missing participants, their frustration with the missing participants, a conclusion of the conference, etc.). As a result, initially-missing participants that join the conference late may not realize that other participants were previously present in the conference. Moreover, if the on-time participants had proceeded with the topic of their meeting and reached a conclusion, late or non-attending participant may be unaware of the discussions or conclusions that took place in the absence of the late or non-attending participants.

To address these issues, a system 100 of FIG. 1 introduces the capability to enable a participant of a multi-party communication session (e.g., a voice conference calling session, a video conference calling session, a multimedia session, a text-based session, etc.) to input a message during the multi-party communication session for presentation to other participants, for instance, when those other participants join the same multi-party communication session at a later time. Specifically, the system 100 may determine an input for specifying a message from a participant of a multi-party communication session after an initiation of the multi-party communication session. By way of example, the message may include (but not limited to) a recording initiated based on an input after the initiation of the multi-party communication session, such as a recording by one participant after joining the multi-party communication session, a recording of discussions or other communications that occur during the multi-party communication session (e.g., including voices of multiple participants), etc. In addition, the multi-party communication session may, for instance, include communication sessions that are intended to be multi-party communication sessions. As such, in some scenarios, a multi-party communication session may be initiated when a first participant becomes available for connection to the communication session even if other participants are not yet connected to the communication session. The system 100 may also cause a presentation of the message to another participant of the multi-party communication session based on a determination that the other participant has joined or tried to join the multi-party communication session. In this way, the system 100 resolves problems associated with typical conferencing services, for example, by allowing participants to leave asynchronous messages in a seamless fashion and, thus, providing an approach for keeping conference participants informed and for speeding up communication between the participants.

In one scenario, for instance, Steve and John may be two participants scheduled to meet at 11:00 a.m. over a multi-party conference (or a multi-party communication session), and Steve may be the conference organizer. As such, Steve may use his mobile phone to dial into a conferencing service at 11:00 a.m. to initiate the conference. Upon entering the appropriate conference identification and conference pin, Steve may be prompted to state his name for the conference. In addition, because Steve is the conference organizer, the conferencing service may also ask Steve to record a greeting (prior to the actual initiation of the conference) to be presented to other participants that may join the conference (e.g., John). After Steve has provided his name and recorded the greeting, the conferencing service may initiate the conference and join Steve into the conference.

If, for instance, John joins the conference at around the scheduled time while Steve is still present in the conference, John may be presented with the greeting that was recorded prior to the initiation of the conference, and the two participants may thereafter conduct their scheduled meeting. On the other hand, if John does not join the conference as scheduled, Steve may decide to leave the conference and come back to the conference at a later time. Thus, Steve may select an option via a conferencing interface on his mobile phone to record a message for John indicating that Steve will be back at a later time (e.g., "I dialed in at the agreed time, but you were not here. I will be back at 11:30 a.m."). The conferencing service may then save Steve's message, and set a trigger for playback of the recorded message when John finally joins the conference. As such, even if Steve is not present in the conference, John will be informed upon joining the conference that Steve will rejoin at 11:30 a.m., and Steve and John will be able to conduct their meeting without any substantial delay.

In a further scenario, John may join the conference at 11:10 a.m. and find out through the presentation of the recorded message that Steve will rejoin the conference at 11:30 a.m. While still in the conference, John may leave a follow-up message for Steve indicating that John will try to rejoin the conference at 11:30 a.m., that John may be a little late, and that Steve should not leave unless John does not arrive by 11:45 a.m. The follow-up message may then be stored in association with a conference identifier of the conference such that the follow-up message may be presented to Steve when he reconnects to the conference. In this way, the conference (or the multi-party communication session) may act as a virtual conference room where messages can be left and accessed by participants (e.g., registered participants, scheduled participants, impromptu participants, etc.).

As shown in FIG. 1, the system 100 comprises user equipments (UEs) 101a-101n (or UEs 101) that may include or be associated with applications 103a-103n (or applications 103). By way of example, the applications 103 may be any type of application that is executable at the UE 101, such as conferencing service applications, media player applications, social networking applications, content provisioning services, etc. In one embodiment, one of the applications 103 at the UE 101 may act as a client for message presentation platform 105 and perform one or more functions associated with the functions of the message presentation platform 105 by interacting with the message presentation platform 105 over communication network 107.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the message presentation platform 105 may include or have access to a message database 109 to access or store message and/or conferencing data, such as default messages, greetings and identifications recorded prior to an initiation of a conference, messages recorded during the conference, parameters associated with the messages, etc. Data stored in the message database 109 may, for instance, be provided by the UEs 101, a service platform 111, one or more services 113a-113n (or services 113), or one or more content providers 115a-115n (or content providers 115). For example, a certain service 113 may provide default messages, and the UEs 101 may provide the recorded greetings, the recorded identifications, and the recorded messages.

In one embodiment, the message presentation platform 105 may be a platform with multiple interconnected components. The message presentation platform 105 may include multiple servers, intelligent networking devices, computing devices, components and corresponding software for performing the function of providing triggered-presentation of a participant message associated with a multi-party communication session. In addition, it is noted that the message presentation platform 105 may be a separate entity of the system 100, a part of the one or more services 113 of the service platform 111, or included within the UE 101 (e.g., as part of the application 103).

In one embodiment, the message presentation platform 105 may cause, at least in part, an enabling of the presentation of the at least one message based, at least in part, on determining that the at least one participant has left the multi-party communication session. As indicated in the above scenario, Steve and John may be two scheduled participants to a multi-party communication session for conducting a meeting. Although Steve may join the multi-party communication session at the scheduled time, John may be late in joining the session, resulting in Steve leaving the multi-party communication session before John arrives. However, as discussed, Steve may select an option via a conferencing interface on his mobile phone to record a message for John indicating that he will be back at a later time. When Steve leaves the multi-party communication session, the message presentation platform 105 may detect that Steve has left and then enable the presentation of the recorded message such that the recorded message will be presented to John upon John's arrival in the multi-party communication session (e.g., the presentation may not be enabled if Steve stayed in the communication session and was presented when John joined the communication session). As such, both conference participants may conduct their meeting in the multi-party communication session at the later scheduled time.

In one embodiment, the message presentation platform 105 may determine one or more parameters for causing, at least in part, the presentation of the at least one message. By way of example, the one or more parameters may include, at least in part, a lifetime parameter, a parameter for determining a number of times to present the at least one message, or a combination thereof. These parameters may, for instance, include preconfigured parameters, user-specified input values, or a combination thereof. In addition, in some embodiments, the lifetime parameter may be determined based, at least in part, on a manual input from the at least one participant, a default value, a scheduled duration of the multi-party communication session, or a combination thereof. In one scenario, for instance, the message presentation platform 105 may prompt Steve (who is the on-time participant) to determine a lifetime parameter of the recorded or the number of times message can be presented. As such, the presentation of a message may have a defined lifetime or a maximum number of playbacks (e.g., one playback) after which the recorded message may no longer be played. In some embodiments, the message presentation platform 105 may delete the recorded message (e.g., from the message database 109) after the time period associated with the lifetime parameter has expired or the maximum number of playbacks has been reached.

In one embodiment, the message presentation platform 105 may determine identity information associated with the at least one other participant, and the presentation of the at least one message may be based, at least in part, on the identity information. For example, with respect to the above scenario, Steve may set the access for the recorded message to only allow John to playback the message. Thus, if there are other participants to the multi-party communication session in addition to Steve and John, those other participants may not be presented with the recorded message when they join the multi-party conference session at a later time. However, when John joins or tries to join the multi-party communication session after the initiation of the multi-party communication session, the message presentation platform 105 may present the recorded message to John after determining that John has joined or tried to join the multi-party communication session based on his identity information (e.g., the recorded message may be presented to John prior to John actually being joined into the multi-party communication session).

In one embodiment, the message presentation platform 105 may cause, at least in part, a presentation of a request to the at least one other participant to select whether to enable or disable the at least one message for one or more subsequent participants of the multi-party communication session. As mentioned in the above scenario, John (the late participant) may be presented with a recorded message to inform John that Steve will be rejoining the multi-party communication session at a later time. In addition, John may be present with a request through the multi-party communication session to select whether to enable or disable the presentation of the message to other subsequent participants of the multi-party communication session (e.g., other late scheduled participants). For example, if John believes that the presentation of the message to the other subsequent participant is not needed or desired, he can disable the presentation of the message to the other subsequent participants. As a result, when the other subsequent participants join the multi-party communication session, they will not be presented with the recorded message.

In one embodiment, the message presentation platform 105 may cause, at least in part, an enabling or a disabling of the at least one message based, at least in part, on whether there are one or more participants connected to or available for connection to the multi-party communication session. In one use case, for instance, the message presentation platform 105 may play back a particular message only when no other participants are connected to the multi-party communication session, or when the participant who created the message is not connected to the multi-party communication session. In this way, the user experience is not degraded as a result of playback of potentially redundant messages.

In one embodiment, the message presentation platform 105 may cause, at least in part, a presentation of an alert message to the at least one participant based, at least in part, on determining that the at least one other participant has joined or tried to join the multi-party communication session, that the at least one other participant has received the at least one message of the at least one participant, or a combination thereof. As mentioned, a first scheduled participant who joins a multi-party communication session to meet with a second scheduled participant may decide to leave the session after realizing that the second participant has not yet joined. Nonetheless, even after the first participant leaves the multi-party communication session, the message presentation platform 105 may notify the first participant (e.g., via email, via text messaging, etc.) that the second participant has joined the multi-party communication session upon detecting the second participant's arrival. As such, the first participant may immediately rejoin the multi-party communication session to conduct the meeting with the second participant, for instance, to avoid any further delay of the meeting.

By way of example, the UE 101, the message presentation platform 105, the services platform 111, and the content providers 115 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
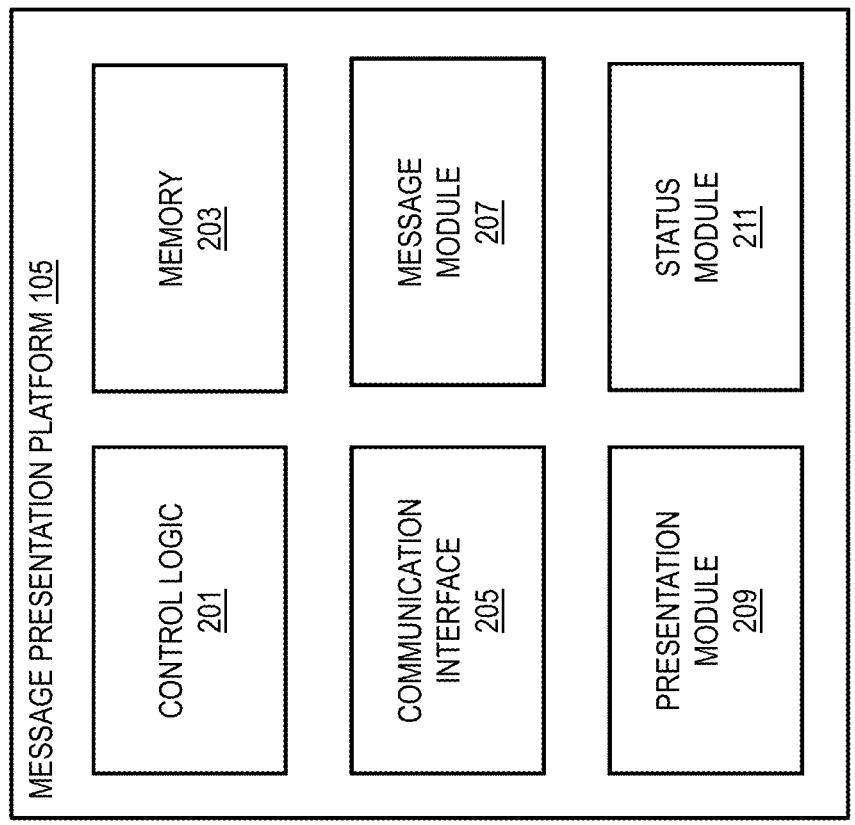
FIG. 2 is a diagram of the components of the message presentation platform, according to one embodiment.

FIG. 2 is a diagram of the components of the message presentation platform 105, according to one embodiment. By way of example, message presentation platform 105 includes one or more components for providing triggered-presentation of a participant message associated with a multi-party communication session. As discussed above, it is contemplated that the functions of these components may be combined in one or more components or performed by other components of equivalent functionality. In this embodiment, the message presentation platform 105 includes control logic 201, memory 203, a communication interface 205, a message module 207, a presentation module 209, and a status module 211.

The control logic 201 executes at least one algorithm for executing functions of the message presentation platform 105. For example, the control logic 201 may interact with the communication interface 205 to enable formation of a multi-party communication session over the communication network 107 between the UE 101, the message presentation platform 105, the services platform 111, the services 113, the content providers 115, etc. The communication interface 205 may, for instance, execute various protocols and data sharing techniques for enabling collaborative execution between the UE 101, the message presentation platform 105, and a conferencing service 115 over the communication network 107.

The control logic 201 may also direct the message module 207 to determine an input for specifying a message from a first participant of a multi-party communication session after an initiation of the multi-party communication session (e.g., a voice conference calling session, a video conference calling session, a multimedia session, a text-based session, etc.). In addition, the presentation module 209 may work with the message module 207 to cause a presentation of the message to a second participant of the multi-party communication session based on determining that the second participant has tried to join the multi-party communication session. In one scenario, for instance, a video conferencing calling session may be initiated after the first participant connects to the session at a scheduled time. Although the first and second participants may have agreed to meet at the scheduled time, the second participant may not join the video conferencing calling session on time. Instead of waiting for the second participant to join, the first participant may opt to leave a recorded message (intended for the second participant) during the video conferencing calling session. The recorded message is then determined by the message module 207, and registered with the presentation module 209 to cause presentation of the message to the second participant when the second participant tries to join the video conferencing calling session.

In certain embodiments, the presentation module 209 may utilize the status module 211 to determine whether the second participant has joined (or tried to join) the multi-party communication session, as well as whether the first participant has left the multi-party communication session. Thus, in some embodiments, the presentation module 209 may also cause an enabling of the presentation of the message based on determining that the first participant has left the multi-party communication session (e.g., the message may not be presented to the second participant if it is determined that the first participant is currently present in the multi-party communication session when the second participant joins). In other embodiments, the status module 211 may determine identity information associated with the second participant, and the presentation module 209 may utilize the identity information to determine whether to present the message to the second participant (e.g., presentation of the message may be limited only to the second participant who may have been indicated by the first participant as the intended recipient).

Figure 3:
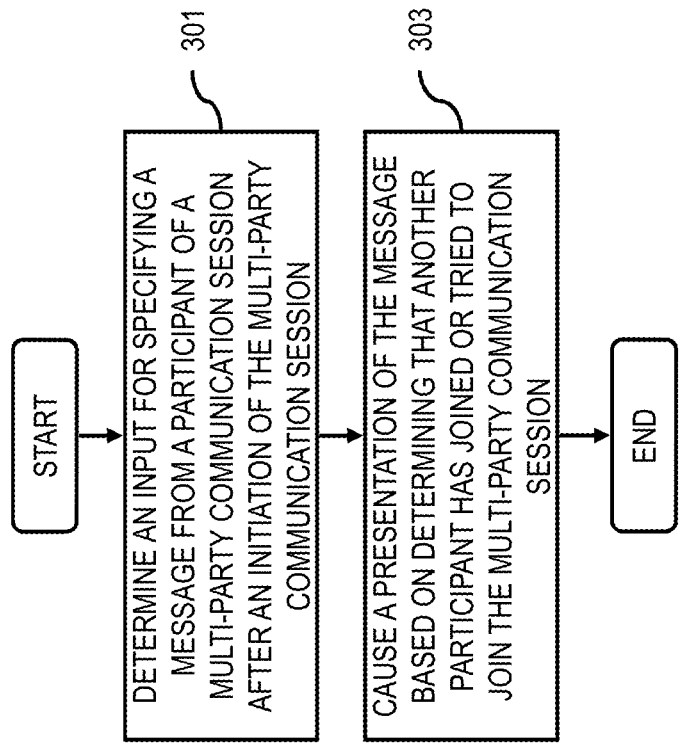
FIG. 3 is a flowchart of a process for providing triggered-presentation of a participant message associated with a multi-party communication session, according to one embodiment.
Figure 8:
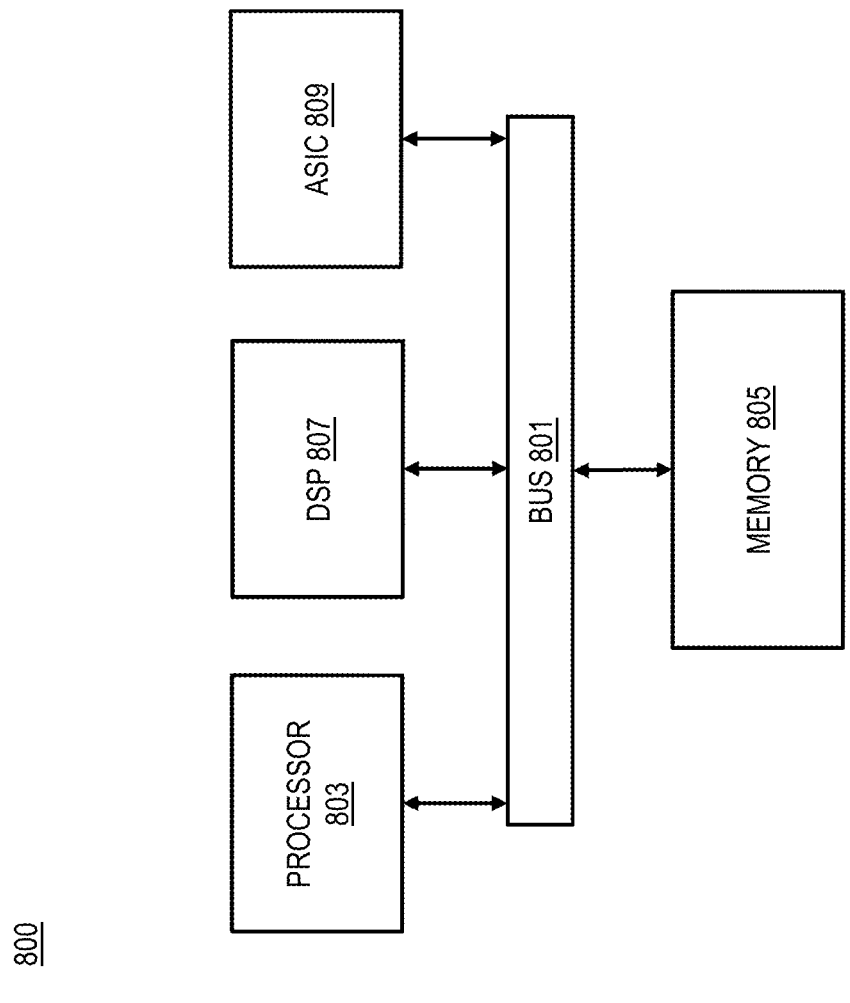
FIG. 8 is a diagram of a chip set that can be used to implement an embodiment of the invention.

FIG. 3 is a flowchart of a process for providing triggered-presentation of a participant message associated with a multi-party communication session, according to one embodiment. In one embodiment, the message presentation platform 105 performs the process 300 and is implemented in, for instance, a chip set including a processor and a memory as shown in FIG. 8. In step 301, the message presentation platform 105 determines an input for specifying a message from the at least one participant of a multi-party communication session after an initiation of the multi-party communication session, such initiation including the event of the first participant becoming available for connection. By way of example, the message may include any recording initiated based on an input after the initiation of the multi-party communication session, such as a recording by one participant after joining the multi-party communication session, a recording of discussions or other communications that occur during the multi-party communication session (e.g., including voices of multiple participants), etc. The message presentation platform 105 may then, in step 303, cause a presentation of a message to the other participant of the multi-party communication session based, at least in part, on determining that the other participant has joined or tried to join the multi-party communication session.

In one scenario, for instance, several participants may be scheduled to meet at a particular time over a multi-party communication session. A host participant (or first participant) may dial-in to a conferencing service to activate and initiate a multi-party communication session. However, prior to the initiation of the multi-party communication session, the conferencing service may request that the host participant record a greeting for other participants that will be joining the communication session (e.g., "Welcome to the ABC Summer Meeting"). After the host participant has recorded (or not recorded) the initial greeting, the conferencing service may thereafter initiate the multi-party communication session and join the host participant into the communication session. After waiting a significant amount of time for other participants to arrive, the host participant may decide to leave the multi-party communication session and rejoin the communication session at a later time. However, the host participant may utilize a conferencing interface associated with the multi-party communication session to record a message for the late participants indicating that the host participant will be back at a later time. The recorded message may be presented to the late participants once the late participants join the multi-party communication session despite the absence of the host participant. Based on the recorded message, all of the participants may then meet at the later scheduled time to conduct their meeting.

Figure 4:
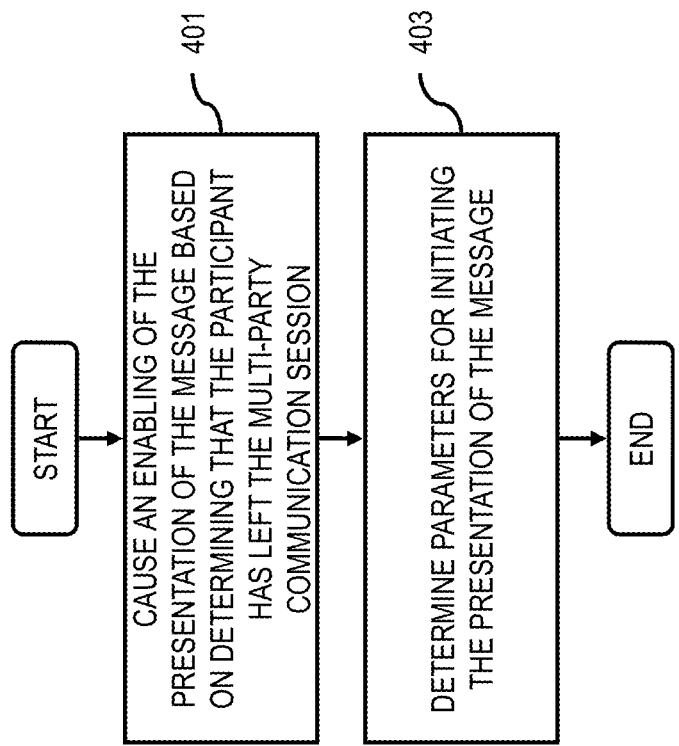
FIG. 4 is a flowchart of a process for enabling and specifying parameters for presentation of a message, according to one embodiment.

FIG. 4 is a flowchart of a process for enabling and specifying parameters for presentation of a message, according to one embodiment. In one embodiment, the message presentation platform 105 performs the process 400 and is implemented in, for instance, a chip set including a processor and a memory as shown in FIG. 8. In step 401, for instance, the message presentation platform 105 causes enabling of the presentation upon determining that one of the participant has left the multi-party communication session. For example, two participants may be scheduled for a multi-party communication session for conducting a meeting. Although a first of the two participants may join the multi-party communication session at the scheduled time, the second participant may be late in joining the session, resulting in the first participant leaving the multi-party communication session before the second participant arrives. Nonetheless, the first participant may select an option via a conferencing interface on his mobile phone to record a message for participant indicating that he will be back at a later time. When the first participant leaves the multi-party communication session, the message presentation platform 105 may detect that the first participant has left and then enable the presentation of the recorded message such that the recorded message will be presented to the second participant upon the second participant's arrival in the multi-party communication session (e.g., the presentation may not be enabled if the first participant stayed in the communication session). As such, both session participants may conduct their meeting in the multi-party communication session at the later scheduled time.

In step 403, the message presentation platform 105 determines another input for specifying one or more parameters for initiating the presentation of the at least one message. For example, the first participant in the scenario of FIG. 4 may specify one or more parameters for initiating the presentation to the late second participant. As discussed, the one or more parameters may include, at least in part, a lifetime parameter, a parameter for determining a number of times to present the at least one message, or a combination thereof. In addition, in some embodiments, the lifetime parameter may be determined based, at least in part, on a manual input from the at least one participant, a default value, a scheduled duration of the multi-party communication session, or a combination thereof.

Figure 5:
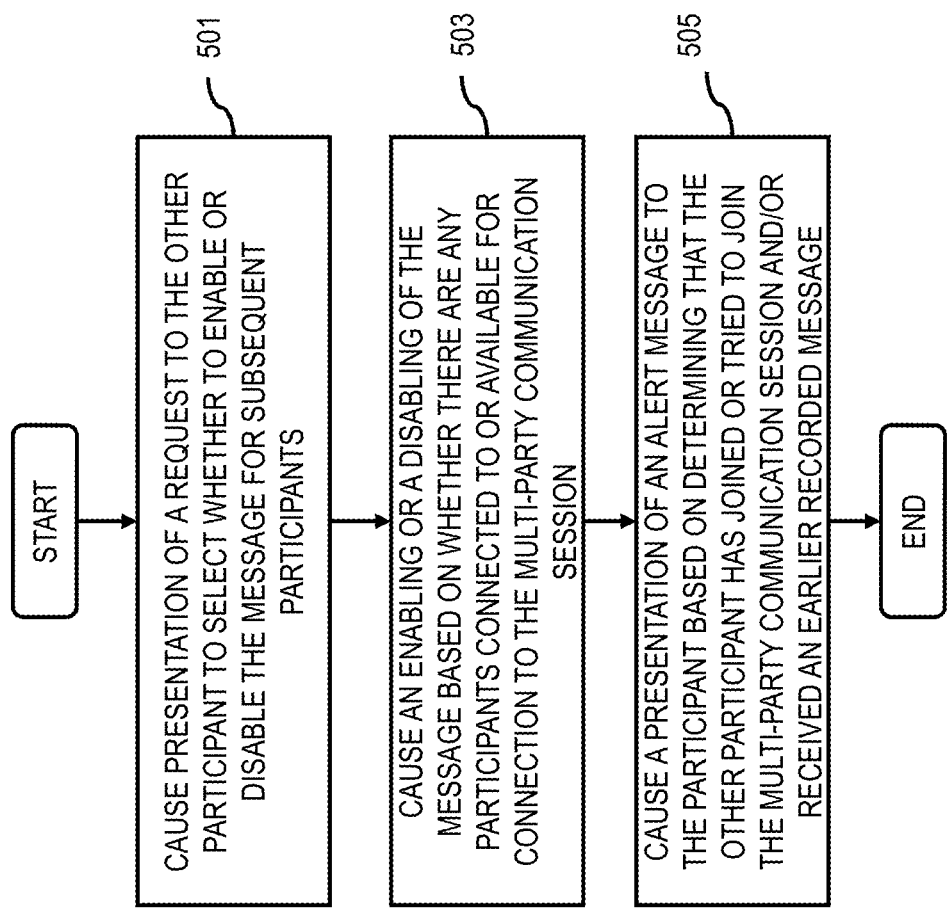
FIG. 5 is a flowchart of a process for causing an enabling or disabling of a message and further causing an alert message to a participant, according to one embodiment.

FIG. 5 is a flowchart of a process for causing an enabling or disabling of a message and further causing an alert message to a participant, according to one embodiment. In one embodiment, the message presentation platform 105 performs the process 500 and is implemented in, for instance, a chip set including a processor and a memory as shown in FIG. 8. In step 501, the message presentation platform 105 causes a presentation of a request to the other participant to select whether to enable or disable the message for subsequent participants of the multi-party communication session. In one scenario, a first scheduled participant who joins a multi-party communication session to meet with second and third scheduled participants may decide to leave the session after realizing that the other participants have not yet joined. However, as indicated, the first participant may record a message for the other participants to inform that he will be rejoining at a later time (e.g., at 11:30 a.m. instead of an originally scheduled time of 11:00 a.m.). When the second participant joins late, the second participant may be presented with the recorded message and also with a request to select whether the message should be enabled or disabled for substantial participants (e.g., the third participant who has not yet joined the session). As such, the second participant may be given control over the access of the recorded message with respect to subsequent participants, for instance, to avoid unnecessary presentations of recorded messages to the subsequent participants (e.g., the second participant may want to record his own message for presentation to the subsequent participants).

In step 503, the message presentation platform 105 also may cause an enabling or a disabling of a message based on whether there are any participants connected to or available for connection to the multi-party communication session. In one use case, for instance, the message presentation platform 105 may play back a particular message only when no other participants are connected to the multi-party communication session, or when the participant who created the message is not connected to the multi-party communication session. In this way, the user experience is not degraded as a result of playback of potentially redundant messages.

In step 505, the message presentation platform 105 may further cause a presentation of an alert message to a participant on determining that the at least one other participant has joined or tried to join the multi-party communication session and/or received an earlier recorded message. As discussed, even after a first participant (e.g., the on-time participant) leaves the multi-party communication session, the message presentation platform 105 may notify the first participant (e.g., via email, via text messaging, via conference application interface etc.) that a late second participant has joined the multi-party communication session upon detecting the second participant's arrival. As such, the first participant may immediately rejoin the multi-party communication session to conduct the meeting with the second participant, for instance, to avoid any further delay of the meeting.

Figure 6A:
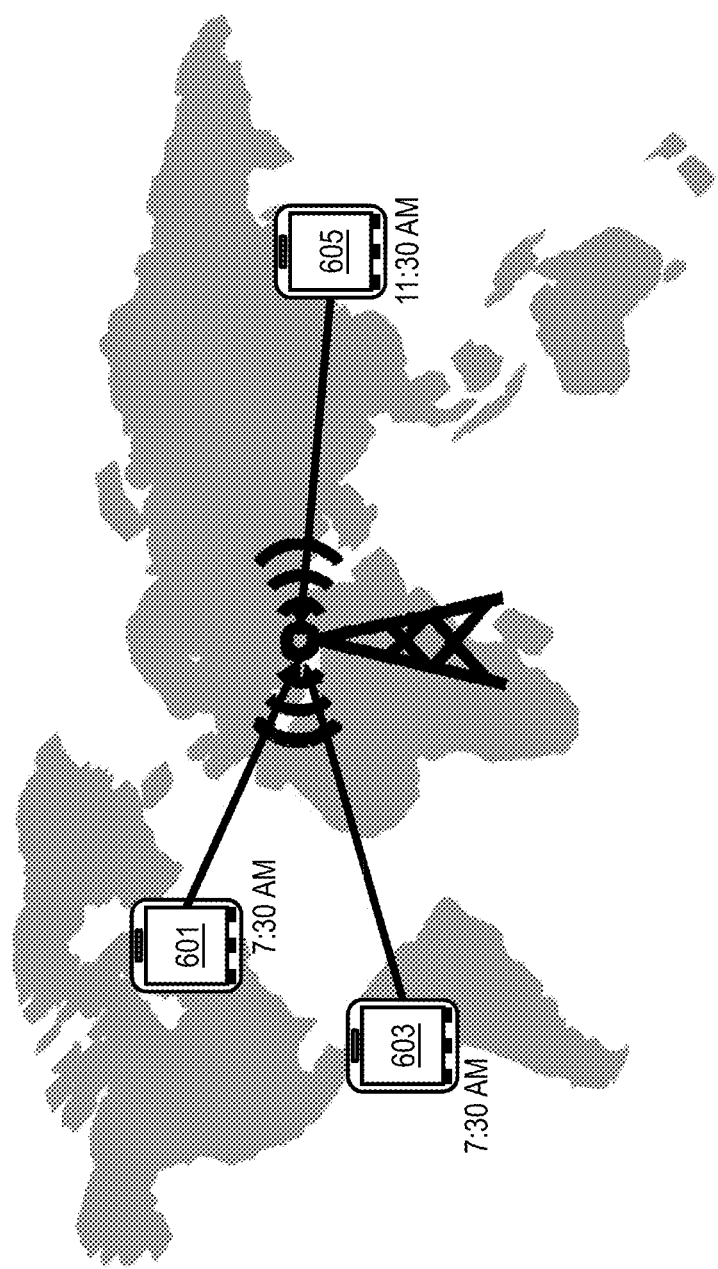
FIGS. 6A and 6B are diagrams of a scenario illustrating triggered-presentation of a participant message associated with a multi-party communication session, according to one embodiment.
Figure 6B:
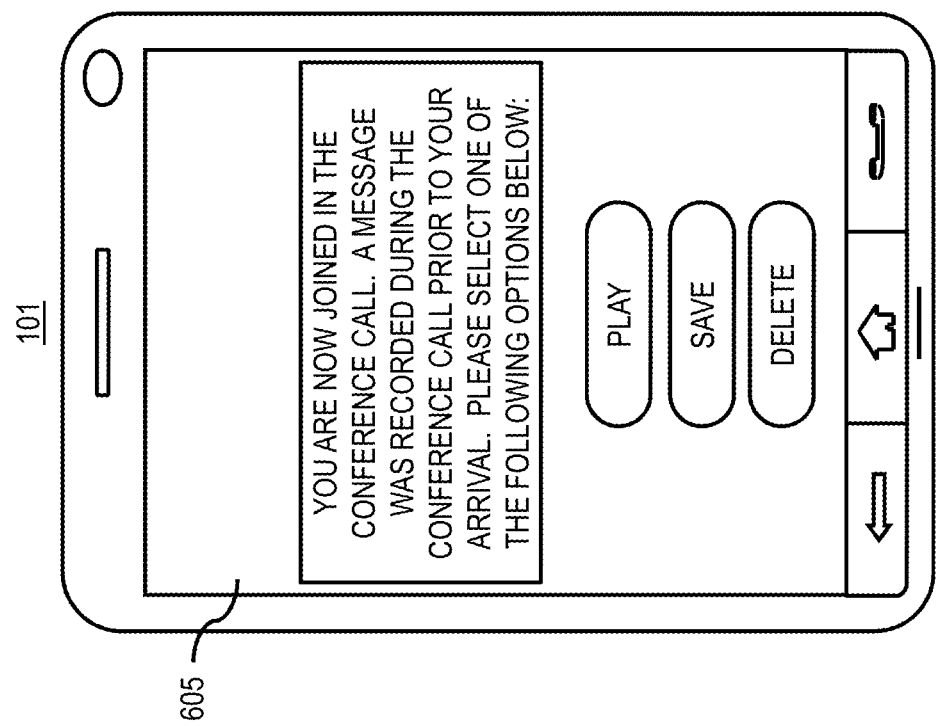

FIGS. 6A and 6B are diagrams of a scenario illustrating triggered-presentation of a participant message associated with a multi-party communication session, according to one embodiment. For example, FIG. 6A illustrates a multi-party communication session scheduled to include participants 601, 603, and 605. As indicated, the multi-party communication session for a meeting may have been scheduled to begin at 7:30 a.m. Although participants 601 and 603 joined the multi-party communication session at 7:30 a.m., participant 605 was not present at 7:30 a.m. to discuss topics of the meeting with participants 601 and 603. As such, participants 601 and 603 may have conducted their meeting and made certain decisions with respect to the meeting topics without the presence of participant 605.

Nonetheless, at the conclusion of the meeting, participants 601 and 603 may opt to record a message intended for participant 605 that details the decisions that were made during the meeting. Although participants 601 and 603 may then leave the multi-party communication session, the session may continue to remain active to allow participant 605 to join at a later time. As shown, participant 605 may join the multi-party communication session at 11:30 a.m. Upon a determination that participant 605 has joined the multi-party communication session, the previously recorded message may be presented to participant 605 in the multi-party communication session. Thus, even though participant 605 missed the live meeting between participants 601 and 603, participant 605 remains informed of the decisions that were made during the meeting without having to directly contact the other participants 601 and 603 for the information. Moreover, while still in the multi-party communication session, participant 605 may leave a follow-up message intended for participants 601 and 603 regarding his comments about the decisions that were made during the live meeting. The follow-up message may, for instance, then be stored in associated with a conference identifier of the multi-party communication session such that the follow-up message may be presented to participants 601 and 603 when they reconnect to the multi-party communication session (e.g., to see whether participant 605 left a follow-up message in response to their recorded message). In this way, the multi-party communication session may act as a virtual conference room where messages can be left and accessed by participants (e.g., registered participants, scheduled participants, impromptu participants, etc.).

FIG. 6B illustrates a user interface of the UE 101 associated with participant 605. As shown, the user interface depicts a notification informing participant 605 that she is currently joined in the conference call (e.g., the multi-party communication session), that a message was recorded during the conference call prior to her arrival, and that she may play, save, or delete the message. As indicated, the message was recorded by participants 601 and 603 to inform participant 605 of the decisions that were made during the meeting between participants 601 and 603. In addition, as discussed, participant 605 may leave a follow-up message while in the conference call to provide participants 601 and 603 (or other potential participants) with comments regarding the decisions that were made during the meeting between participants 601 and 603.

The processes described herein for providing triggered-presentation of a participant message associated with a multi-party communication session may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
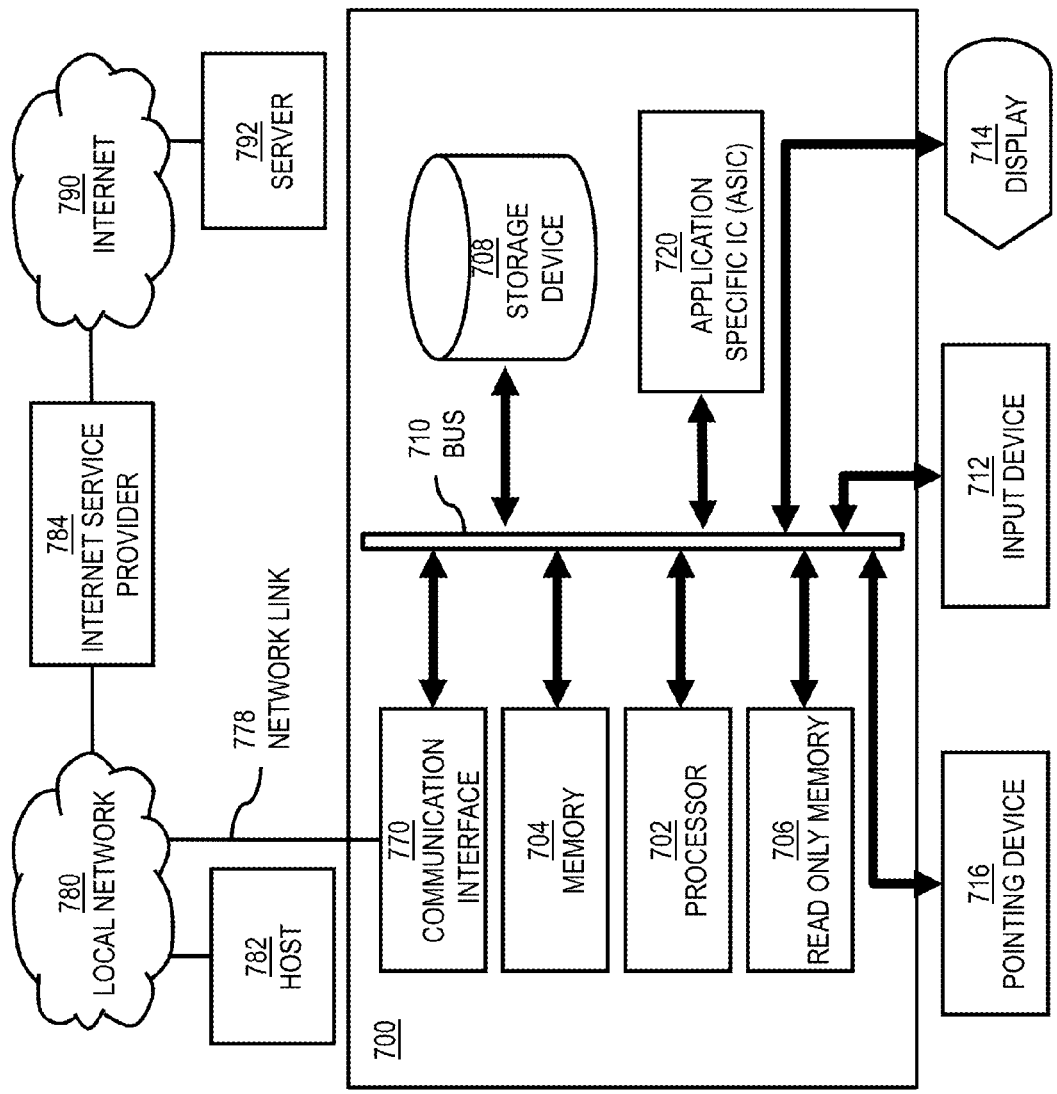
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) for providing triggered-presentation of a participant message associated with a multi-party communication session as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing triggered-presentation of a participant message associated with a multi-party communication session.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to providing triggered-presentation of a participant message associated with a multi-party communication session. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 700 also includes a memory 704 coupled to bus 710. The memory 704, such as a random access memory (RAM) or any other dynamic storage device, stores information including processor instructions for providing triggered-presentation of a participant message associated with a multi-party communication session. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing triggered-presentation of a participant message associated with a multi-party communication session, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, touch sensitive screen, or a motion sensor, for issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 107 for providing triggered-presentation of a participant message associated with a multi-party communication session to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide triggered-presentation of a participant message associated with a multi-party communication session as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing triggered-presentation of a participant message associated with a multi-party communication session.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 805. A DSP 807 typically is configured to process real-world signals (e.g., sound) in real time independently of the processor 803. Similarly, an ASIC 805 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide triggered-presentation of a participant message associated with a multi-party communication session. The memory 805 also stores the data associated with or generated by the execution of the inventive steps.

Figure 9:
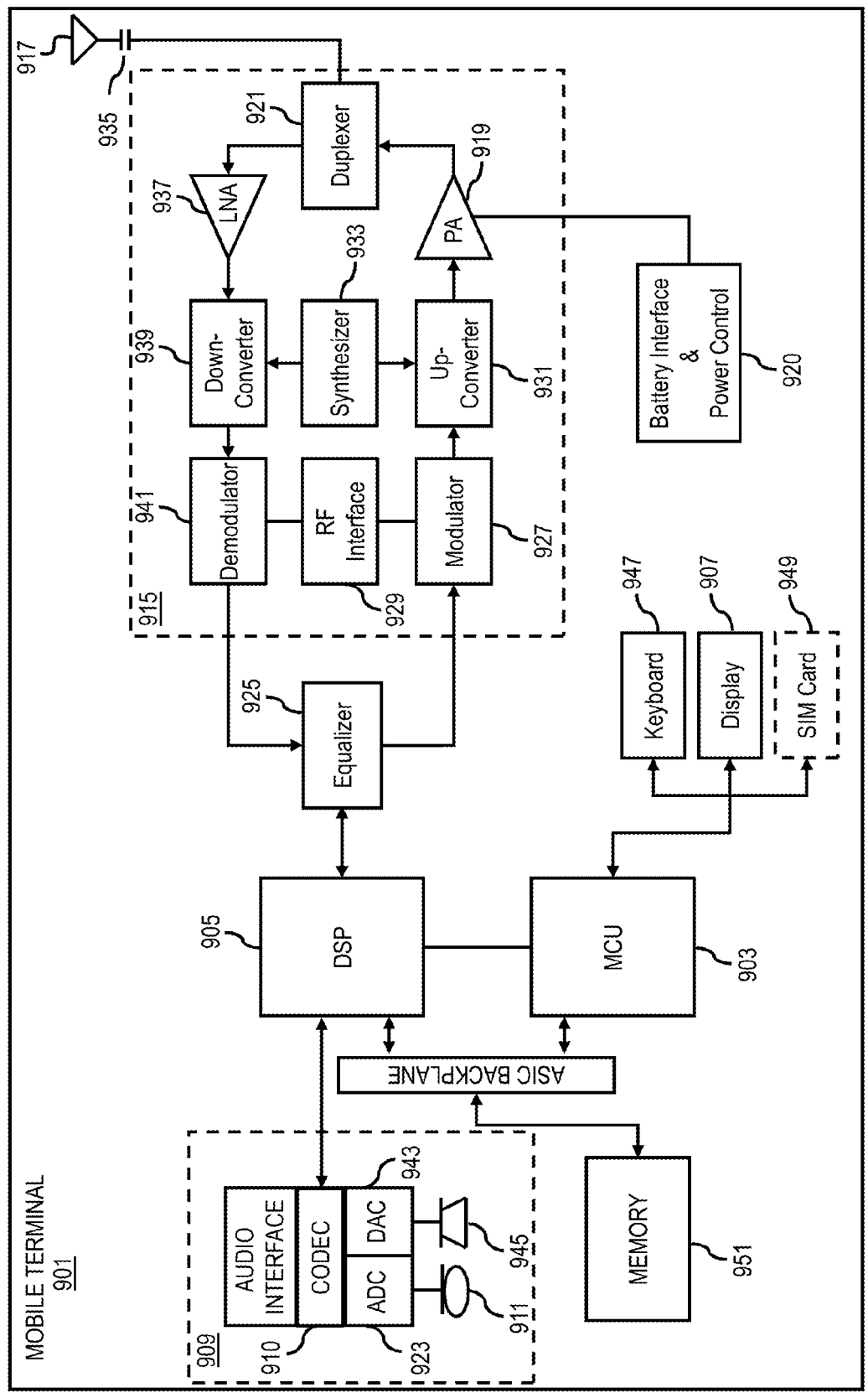
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing triggered-presentation of a participant message associated with a multi-party communication session. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing triggered-presentation of a participant message associated with a multi-party communication session. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 912.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs user interface software to facilitate user control of at least some functions of the mobile terminal 901 to provide triggered-presentation of a participant message associated with a multi-party communication session. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 912 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
  determining one or more inputs for specifying at least one message from at least one participant of a multi-party communication session after an initiation of the multi- party communication session wherein the at least one message includes a recording by the at least one participant;

causing, at least in part, a presentation of the at least one message to at least one other participant of the multi-party communication session based, at least in part, on determining that the at least one other participant has joined or tried to join the multi-party communication session;

causing, at least in part, a presentation of a request to the at least one other participant to select whether to enable or disable the at least one message for one or more subsequent participants of the multi-party communication session; and enabling of, with a processor, the presentation of the at least one message based, at least in part, on determining that the at least one participant has left the multi-party communication session.

2. A method of claim 1, wherein the multi-party communication session includes, at least in part, a voice conference calling session, a video conference calling session, a multimedia session, a text-based session, or a combination thereof.

3. A method of claim 1, further comprising determining one or more parameters for causing, at least in part, the presentation of the at least one message.

4. A method of claim 3, wherein the one or more parameters include, at least in part, a lifetime parameter, a parameter for determining a number of times to present the at least one message, or a combination thereof.

5. A method of claim 4, further comprising determining one or more lifetime parameter based, at least in part, on a manual input from the at least one participant, a default value, a scheduled duration of the multi-party communication session, or a combination thereof.

6. A method of claim 1, further comprising determining identity information associated with the at least one other participant,
wherein the presentation of the at least one message is based, at least in part, on the identity information.

7. A method of claim 1, further comprising enabling or a disabling of the at least one message based, at least in part, on whether there are one or more participants connected to or available for connection to the multi-party communication session.

8. A method of claim 1, further comprising presenting an alert message to the at least one participant based, at least in part, on determining that the at least one other participant has joined or tried to join the multi-party communication session, that the at least one other participant has received the at least one message, or a combination thereof.

9. An apparatus comprising:
at least one processor; and
at least one memory including computer program code for one or more programs,
the at least one memory and the computer program code configured to, with the at least one processor, cause the apparatus to perform at least the following,
determine an input for specifying at least one message from at least one participant of a multi-party communication session after an initiation of the multi-party communication session wherein the at least one message includes a recording by the at least one participant;

cause, at least in part, a presentation of the at least one message to at least one other participant of the multi-party communication session based, at least in part, on determining that the at least one other participant has joined or tried to join the multi-party communication session;

cause, at least in part, a presentation of a request to the at least one other participant to select whether to enable or disable the at least one message for one or more subsequent participants of the multi-party communication session; and cause, at least in part, an enabling of the presentation of the at least one message based, at least in part, on determining that the at least one participant has left the multi-party communication session.

10. An apparatus of claim 9, wherein the multi-party communication session includes, at least in part, a voice conference calling session, a video conference calling session, a multimedia session, a text-based session, or a combination thereof.

11. An apparatus of claim 9, wherein the apparatus is further caused to:
determine one or more parameters for causing, at least in part, the presentation of the at least one message.

12. An apparatus of claim 11, wherein the one or more parameters include, at least in part, a lifetime parameter, a parameter for determining a number of times to present the at least one message, or a combination thereof.

13. An apparatus of claim 12, wherein the apparatus is further caused to:
determine the lifetime parameter based, at least in part, on a manual input from the at least one participant, a default value, a scheduled duration of the multi-party communication session, or a combination thereof.

14. An apparatus of claim 9, wherein the apparatus is further caused to:
determine identity information associated with the at least one other participant,
wherein the presentation of the at least one message is based, at least in part, on the identity information.

15. An apparatus of claim 9, wherein the apparatus is further caused to:
cause, at least in part, an enabling or a disabling of the at least one message based, at least in part, on whether there are one or more participants connected to or available for connection to the multi-party communication session.

16. An apparatus of claim 9, wherein the apparatus is further caused to:
cause, at least in part, a presentation of an alert message to the at least one participant based, at least in part, on determining that the at least one other participant has joined or tried to join the multi-party communication session, that the at least one other participant has received the at least one message, or a combination thereof.

* * * * *